April 23, 1940.  H. A. REECE  2,197,947
APPARATUS FOR CONTROL OF AIR SUPPLY AND METHOD OF SECURING
ACCURATE RESULTS IN OPERATION OF FURNACES
Filed June 17, 1939   2 Sheets-Sheet 2
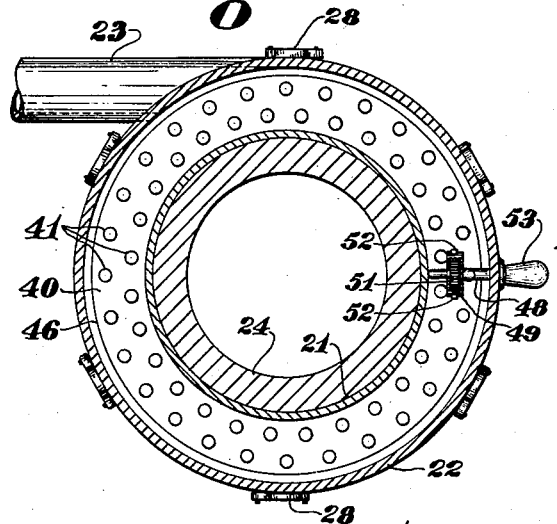
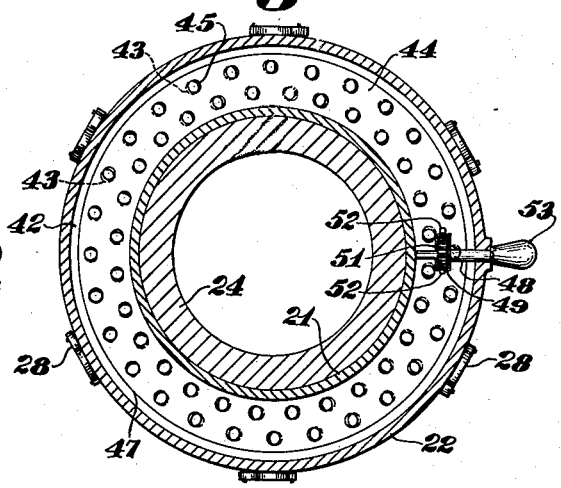
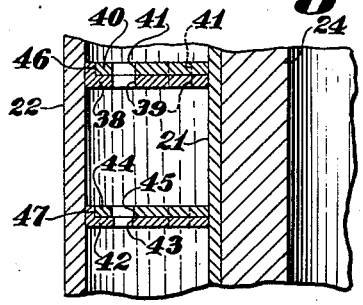
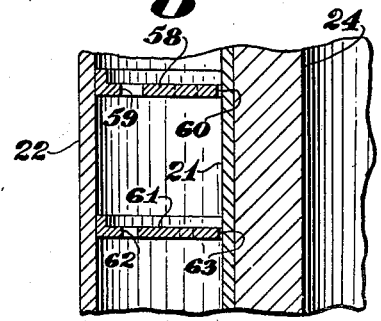
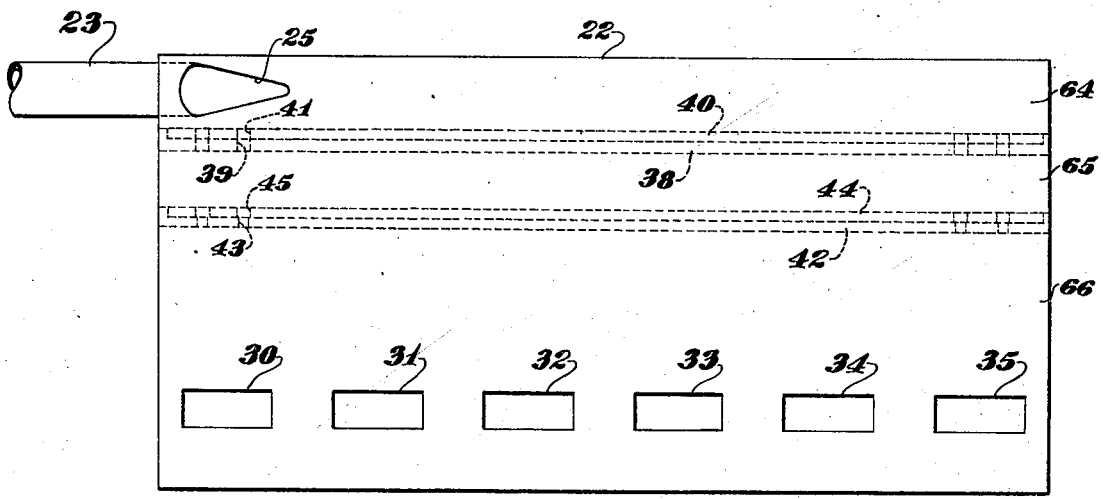
INVENTOR.
Herbert A Reece.

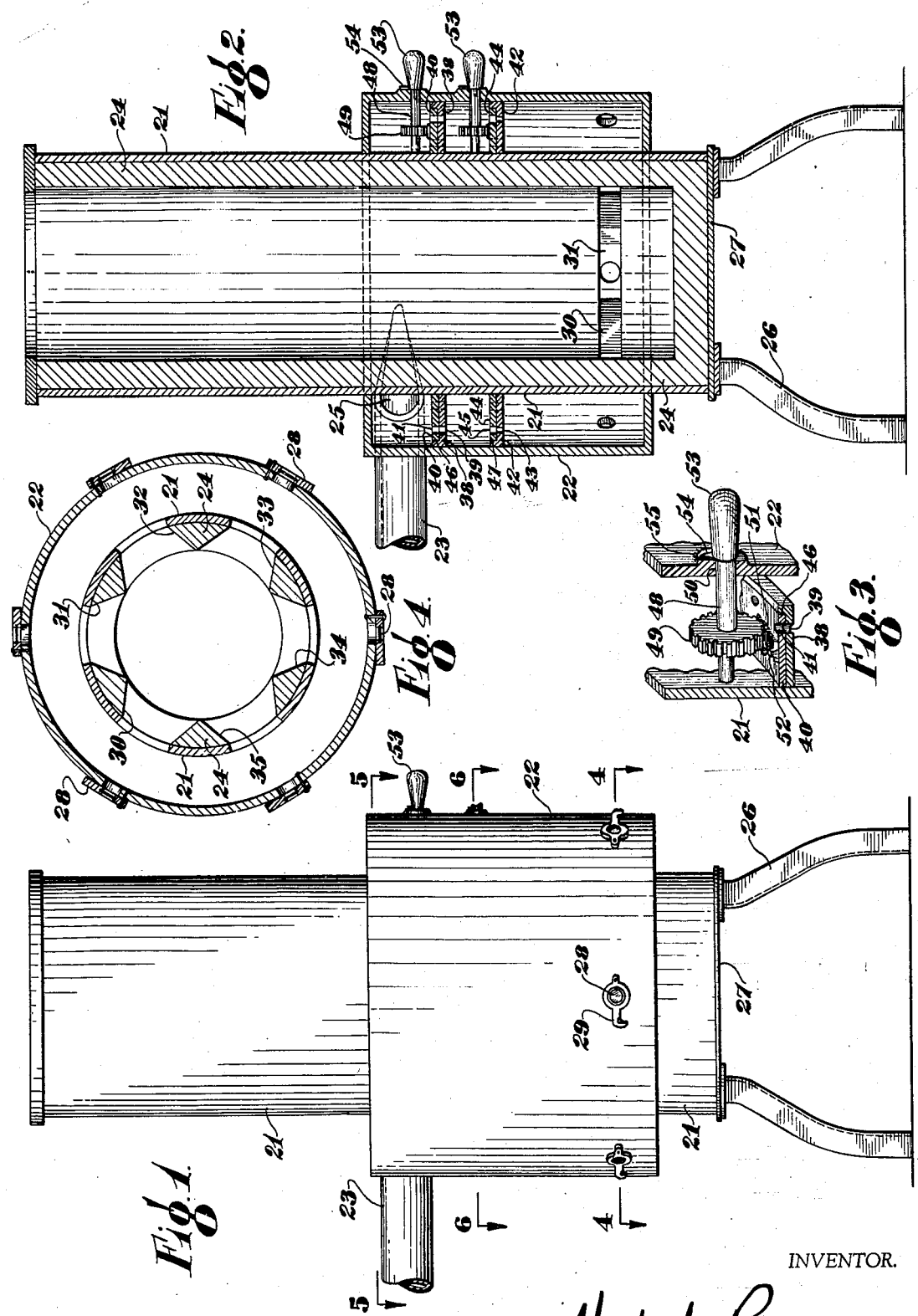

Patented Apr. 23, 1940

2,197,947

UNITED STATES PATENT OFFICE 2,197,947

APPARATUS FOR CONTROL OF AIR SUPPLY AND METHOD OF SECURING ACCURATE RESULTS IN OPERATION OF FURNACES

Herbert A. Reece, Cleveland Heights, Ohio, assignor to Meehanite Metal Corporation, a corporation of Tennessee Application June 17, 1939, Serial No. 279,704

15 Claims. (Cl. 266—30)

My invention relates to furnaces, and more particularly to wind boxes for metallurgical furnaces such as cupolas and the like, and to the operation of the same.

In the following discussion the operation and structure of a cupola for the remelting of metal will be referred to but it is to be understood that my invention includes the structure and operation of all furnaces wherein a blast of air or other gases is supplied through a plurality of tuyères or like openings to the interior of the furnace.

In the operation of metallurgical furnaces such as cupolas it is necessary to supply a blast of air to the interior of the furnace for supplying the air to the furnace contents being processed to promote combustion.

The shaft of the cupola to be operated is charged with alternate layers of one or more charges of coke and of the metal to be melted so that there is a layer of metal disposed upon each layer of coke. The alternate layers of coke and metal are placed in layers in the cupola so that they occupy substantially horizontal strata. As the melting operation continues the successive layers sink through the stack and are disposed in substantially the same horizontal layers. The coke upon being ignited is in an incandescent state and the oxygen of the air blown into the furnace unites with the coke carbon and oxides of the carbon are formed. The location where this union takes place and where the greatest heat is liberated is referred to as the melting zone as it is here that the heat is sufficient to melt the metal which thereupon falls to the bottom of the cupola in a molten state. Inasmuch as the coke is disposed in a horizontal layer the air supplied for uniting with the coke should be introduced into the furnace in such a way as to cause an even distribution of air throughout the layer of coke. The air should reach this horizontal layer of coke substantially simultaneously and at the same velocity in all portions of the horizontal layer.

The blast of air is supplied to the interior of the cupola through a number of tuyères or conduits extending through the wall of the body of the cupola. The tuyères are usually arranged substantially at one horizontal plane and around the periphery of the body of the cupola. In other possible arrangements, the tuyères may be located in more than one layer, that is, there may be one set of tuyères in one horizontal plane and another set of tuyères in another horizontal plane, or the tuyères may be otherwise arranged.

For the purpose of simplification and clarity, my invention will be discussed in connection with the embodiment in which one set of tuyères arranged in substantially one horizontal plane is utilized. It is to be understood, however, that my invention is likewise applicable to other arrangements of the tuyères and the scope of my invention includes the modifications and changes which may be made for the adaptation to all of said other arrangements.

The melting zone in a properly operated cupola is located within the shaft at a level above the tuyères through which the air blast enters. For obtaining a proper melt of metal having the essential qualities, it is desirable that all of the melting be done uniformly and at the proper location in the shaft. The melting zone should be within a stratum or section of the charge in the cupola substantially parallel to the plane of the set of tuyères and combustion should be substantially uniform throughout the area of that stratum. In other words, the oxygen of the air blast from the several tuyères should unite with the carbon of the coke at substantially the same level above the air supplying tuyères throughout the cross-section area of the body of the cupola. This desired control of the melting operation by controlling the location of the melting zone is a most sought for objective in the art and has been a major problem in the operation of furnaces utilizing a blast of air.

The placing and distribution of tuyères of proper size around the periphery of the body of the cupola is important in the control of the melting zone but is not sufficient alone as the variations in the velocity of the air entering each of the several tuyères greatly influences the type of melting zone obtained. While the equalizing of the size of the tuyères and the uniform positioning of the tuyères have aided in the control of the melting zone, the control of the velocity of the air entering each of the tuyères is the major influencing factor in the effective control of the melting zone. It has been shown by measuring the actual velocity of flow through the tuyères with an anemometer that in the absence of control of velocities as is provided by my invention there may be great variations in velocity from tuyère to tuyère and also at various positions within the same tuyère.

A difference in velocity of air from the respective tuyères tends to cause "step melting" that is, melting at different heights. In such a condition of "step melting" the gases at equal distances from the various tuyères have varying ratios of carbon dioxide to carbon monoxide resulting in unequal temperatures of the various globules of molten iron and where this variation occurs the absorption power of the iron for various gases varies so as to give a molten metal which is not in equilibrium to itself or to the gases, thereby resulting in the production of a molten metal containing undesirable amounts of gases which are not retained at temperatures approaching solidification and resulting in castings which are defective due to gaseous extrusions for which the technical term of "differential oxidation" or "gasification" has been evolved.

In order to approach uniformity in volume and velocity, as closely as possible, in the supply of the air blast to the plurality of tuyères positioned around the periphery of the body of the furnace, it has been the practice to supply the tuyères from a common source. This is done by positioning an air chamber adjacent to the body of the furnace so that all of the tuyères communicate with, and are supplied by, this common chamber. The air chamber in turn is supplied with a blast of air through an inlet conduit from a suitable air blower. This common air chamber through which the air blast flows from the inlet conduit to the opening to the tuyères is called by various names in the art, such as, wind box, wind belt, bustle, and air box, and will be referred to herein as a wind box. It assumes various forms and may have an arcuate or rectangular cross-section. Generally, it surrounds the body of the furnace at a low level where communication with the tuyères may be established directly or through relatively short inter-communicating conduits leading to each tuyère.

As has been stated, uniformity of velocities of the air blast entering each tuyère is a desired objective. It has been thought that this could be accomplished by partly shutting off one or more of the tuyères or the intercommunicating conduits leading to each tuyère from the wind box. However, in practice this has not worked out successfully as the partial shut-off limits the volume of air admitted and causes lack of uniformity of the volume of air supplied to the several tuyères. A partial restriction placed at a tuyère or at the short intercommunicating conduit leading to the tuyère also tends to deflect back a portion of the air blast so as to cause a back pressure and to thus further throttle the flow of the air blast. It has therefore been necessary to obtain this uniformity of velocities by other means.

Prior to this invention numerous attempts have been made to regulate volumes and velocities of air through slide valves or the like at each tuyère or in the conduit to each tuyère. Such attempts have been unsuccessful in that in dampening off a main current of air or other gas, air pockets are formed and currents of air are deflected back into the path of travel of the air due to compressing the air at the point of restriction by the slide valve. This creation of air pockets and deflected air currents so interferes with the flow of air supplied to the tuyère to which such control is attempted that the volume of air supplied to that tuyère is diminished and results in the relative volume at all the tuyères being disturbed. The decrease in the volume of air admitted to one tuyère tends to increase the volume of air supplied to other tuyères. This throwing out of balance of the ratio of the air volumes to the tuyères is referred to as a disturbance of the volume. Because the volume of air being supplied to the wind box is kept constant, either by the operator or by automatic devices, it follows that it is impossible to alter the flow through one tuyère without effecting the flow through one or more of the remaining tuyères and thus each adjustment creates a new set of conditions and makes it practically impossible to obtain predetermined results.

Attempts have been made to equalize the velocity and volume flow through the tuyères by changing the method of supplying air to the wind box. In some cases the air is supplied through two or more connector pipes entering at or near the top of the wind box in either a vertical or horizontal position, however this does not solve the problem because serious disturbances result from passing more than one current of air through the same wind box. In many cases the blast pipe enters the wind box horizontally on a tangent so that the air is caused to circle in almost a horizontal plane around the wind box. In an actual test of such design it was shown by taking anemometer readings at four places across the area of opening of each of the tuyères in one horizontal row that air was being supplied to the stack of the furnace at three adjacent positions in one tuyère and that air was being drawn from the stack at the fourth position. This is caused by the rapid tangential flow of air past the tuyères. However, due to disturbances in the tangential flow, this condition was not the same in all the tuyères.

It is an object of my invention to provide a wind box for supplying an air blast at substantially equal velocities to each of a plurality of tuyères.

It is an object of my invention to provide apparatus for obtaining substantially equal distribution of air to each tuyère opening.

Another object is to provide apparatus for the elimination of uneven flow of air through the wind box.

Another object is to provide apparatus for the elimination of tangential flow of air in a compartment wind box.

Another object is to provide a wind box for supplying an air blast to each of a plurality of tuyères at substantially equal velocities.

A further object is to provide an apparatus for supplying an air blast to each of several tuyères at desired velocity without disturbing the relative volume of air supplied to each of the several tuyères.

Another object is to provide an improved method of supplying an air blast for a plurality of tuyères of a furnace.

And a still further object is the provision of an apparatus and method for production of molten metal of an improved and uniform quality.

Other objects and a fuller understanding of my invention may be had by referring to the following description and claims, taken in conjunction with the accompanying drawings, in which:

Figure 1 is an elevational view of a cupola and a wind box mounted thereon.

Figure 2 is a cross-sectional view taken lengthwise of the cupola and the wind box shown in Figure 1.

Figure 3 is a detailed view showing in enlarged form the apparatus for adjustably changing the size of the openings in the baffle plates.

Figure 4 is a cross-sectional view of the cupola taken through the line 4—4 of Figure 1.

Figure 5 is a cross-sectional view of the cupola taken through the line 5—5 of Figure 1.

Figure 6 is a cross-sectional view of the cupola taken through the line 6—6 of Figure 1.

Figure 7 is a detailed view showing the arrangement of the baffle plates within the wind box.

Figure 8 illustrates a modified form of baffle plate in which there is no adjustable means for changing the size of the openings in the baffle plate and in which there is an open space left between the body of the cupola and the baffle plates.

And Figure 9 is a diagrammatical view of a wind box embodying features of my invention and illustrates the wind box opened up and lying in the flat so as to demonstrate the relative positioning of the parts and their cooperation.

The cupola shown in Figure 1 has a cupola body 21 which sets upon the support 26. The cupola body or shell 21 is in the form of a cylindrical shaft, the inner walls of the cupola body 21 being lined by the fire brick lining 24. The body 21 and the lining 24 are mounted upon the bottom plate.

For purposes of simplicity in illustration, the usual tap hole and slag hole are not shown. It has also been considered unnecessary to illustrate such other openings as a clean-out door, breast arch, or drop bottom doors. The cupola illustrated, however, may be considered as having all of the parts necessary for the usual operation of the same.

The wind box 22 of cylindrical shape is mounted upon the cupola body 21 by welding or other suitable means and in the embodiment shown, the outer wall of the cupola body forms one of the enclosing walls of the wind box 22. It is therefore seen from the views of Figures 1 and 2 that the wind box 22 forms an enclosed jacket surrounding the cupola body 21 in such a way that air introduced into the wind box may circulate entirely around the cupola body.

The inlet conduit 23 is in communication with the air blower or other source of an air blast and the inlet conduit 23 is connected to the wind box 22 at the upper portion of the wind box 22 so as to afford communication between the air blower and the inlet opening 25 of the wind box 22.

In the cupola illustrated there are six tuyères extending through the wall and lining of the cupola body 21 so as to establish communication between the interior of the shaft of the cupola and the wind box 22. Tuyères 30, 31, and 32 are illustrated in Figure 2. All six tuyères, 30, 31, 32, 33, 34 and 35 are illustrated in Figures 4 and 9. These tuyères are of substantially equal size and are uniformly spaced around the periphery of the cupola. It is to be noted that the tuyères enter the cupola body at a low level in the cupola and communicate with the wind box in a lower portion thereof. In order that the operator may look into the tuyères from the outside of the furnace, peep holes are provided in the wind box opposite each of the tuyères and mica or other suitable substance is sealed over these peep holes. Except when necessary, peep hole covers 28 hingedly connected to the wind box 22 are kept in position over the peep holes by means of the latch members 29.

Positioned within the wind box below, and at a distance from, the inlet opening 25 is a fixed annular baffle plate 38 encircling the cupola body and which is secured to the walls of the wind box 22 and the cupola body 21 by welding or other suitable means. The baffle plate 38 extends transversely of the wind box 10 in the path of the flow of air from the inlet opening 25 to the tuyères 30, 31, 32, 33, 34, and 35. The baffle plate 38 has a shoulder portion 46 extending around its outer periphery closely adjacent to the wall of the wind box 22. A movable annular baffle plate 40 rests upon the baffle plate 38 and is positioned between the shoulder 46 and the wall of the cupola body 21. The engagement of the baffle plate 40 and the baffle plate 38 is such that the movable baffle plate 40 may be slidably moved relative to the fixed baffle plate 38. Since the cupola body 21 is circular in cross-section and the baffle plates are also annular in form the upper baffle plate 40 may revolve relative to the cupola body 21.

Positioned within the wind box below the baffle plate 38 and also intermediate of the inlet opening 25 and the plurality of tuyères is another fixed baffle plate 42. The lower baffle plate 42 is mounted in the wind box 22 and secured to the walls thereof in a manner similar to that described for baffle plate 38. The baffle plate 42 is similar to the baffle plate 38 in that it also has a shoulder portion 47 extending around its peripherial edge. A lower movable baffle plate 44 is supported on, and slidably moved relative to, the baffle plate 42 in the same way as described for baffle plates 38 and 40. The lower baffle plates are intermediate of the upper baffle plates and the level of the tuyères. The lower baffle plates may be positioned immediately adjacent to the upper baffle plates and also other baffle plates may be added in other embodiments of my invention.

The baffle plate 40 is perforated over its surface and has uniformly distributed therein a plurality of openings or open spaces 41 and the baffle plate 38 is likewise perforated and has a similar distribution of openings or open spaces 39 of substantially the same size. The openings 41 and 39 in the baffle plates 40 and 38, respectively, are adapted to register upon movement of the baffle plate 40 into proper registering position. By the varying of the degree of registration of the openings 39 and 41 a change in the degree of restriction offered by the openings may be made.

The lower baffle plate 42 and the lower movable baffle plate 44 similarly have openings 43 and 45, respectively, which are adapted to register upon movement of the baffle plate 44 into registering position. Similarly change in the registering position of the baffle plate 44 to varying degrees of registration changes the respective amount of restriction offered by the openings in the baffle plate. The total area of the openings in each of the baffle plates is in relation to the cross-section area of the blast pipe or to the cross-section area of all the tuyères. A preferable relationship has been found to reside in a total area of the openings in each baffle plate at approximately twice the cross-section area of the blast pipe. Under some conditions it may be preferable to provide openings having a total area of more or less than the described relationship of one to two.

To provide means for readily changing the degree of registration of the openings in the complementary baffle plates from the outside of the wind box 22 there is provided an arrangement of parts shown in more detail in Figure 3. A crank shaft 48 is extended through an air-tight opening 50 in the wall of the wind box 22 in such manner to permit rotation of the shaft 48 by rotation of the handle 53 on the outside of the wind box. A gear 49 non-rotatively secured to the shaft 48 has teeth engaging in the teeth of the rack 51 formed upon the upper surface of the movable baffle plate. Figure 3 shows only the arrangement for moving the upper baffle plate 40 but the driving arrangement for moving both the baffle plate 40 and the baffle plate 44 is the same. The teeth of the rack 51 may be formed integrally with the movable baffle plate or it may be otherwise suitably secured thereto. At the opposite limits of the rack 51 there is provided the stops 52 which permit movement of the baffle plate only within the limits of the rack 51 between the stops 52. Upon the outside of the wind box there is secured to the shaft 48 an indicator pointer 54 which revolves with the rotation of the shaft 48. The indicator pointer 54 indicates upon suitable dial marks 55 on the outside of the wind box the relative rotation of the shaft 48 and thus indicates the degree of registration of the openings adapted to register. By predetermining the position of the dial marks the exact degree of registration of the openings may be read from the outside of the wind box. The indicator and dial for the upper movable plate will indicate the degree of registration of the openings 41 and 39 and the indicator and dial for the lower baffle plate will indicate the degree of registration of the openings 43 and 45. Therefore by this means the amount of restriction offered by the two sets of complementary baffle plates may be readily determined and adjusted.

Figure 5 being a cross-sectional view taken through the line 5—5 of Figure 1 shows the position of the movable baffle plate 40 upon the top of the fixed baffle plate 38, only the shoulder portion 46 of the baffle plate 38 being visible from above. In the arrangement shown in the figures of the drawings the openings 39 and 41 are in complete registration and therefore only the openings 41 are outlined in the drawings. Both the openings 41 and 39 are uniformly distributed throughout their respective baffle plates to provide uniform restricting action throughout the cross-section area of the wind box at the baffle plate. The body of the baffle plate intermediate of the open spaces provides a uniform amount of resistance to the flow of the air blast through the wind box at the plane of the baffle. Figure 5 also illustrates the positioning of the parts for slidably moving the baffle plate 40 and illustrates the position of the stops 52 at the opposite limits of the rack 51.

Figure 6 being a cross-sectional view through the line 6—6 of Figure 1 illustrates the relative positioning of the baffle plates 42 and 44 with the baffle 44 slidably engaging upon the top of the baffle plate 42. In the arrangement of the invention shown in these figures of the drawings the openings 43 and 45 are not in complete registration and therefore an edge of the openings 43 is seen through the openings 45. As described for the upper baffle, the openings in the lower baffle are uniformly distributed to permit limited flow substantially uniformly throughout the cross-section area of the wind box at the baffle plate. The body of the baffle plate provides a resistance to the flow of the air blast through the wind box at the location of the plane of the baffle plate. By reason of the decreased effective open space provided by the lack of complete registration of the openings 43 and 45 a greater degree of restriction is offered by the baffle plates 42 and 44 than that offered by the baffle plates 38 and 40.

There is an increase in resistance and greater limitation of flow through the decrease in size of the opening of the lower baffle plates and hence a greater rectifying force to the flow of the air blast. By regulating the degree of restriction offered by the pairs of complementary baffle plates by means of the operation of the handles 53 the relative degree of restriction desired in the various levels of the wind box may be obtained.

The view of Figure 7 is somewhat larger than that shown in Figures 2, 5 and 6 and better illustrates the relative positions of the complementary baffle plates, the registration of their openings, and the other relative spacing of the parts.

Figure 8 illustrates a modified form of my invention in which the size of the open spaces in the baffle plates remains the same without means for adjustment. In this modified form the upper baffle plate 58 is secured to the wall of the wind box 22 by welding or other suitable means. A small annular open space 60 is left between the wall of the cupola body 21 and the baffle plate 58 and the weight of the baffle plate is carried by the wall of the wind box 22. The annular open space 60 extending around the inner periphery of the baffle plate 58 permits a limited flow of air to pass therethrough from one side of the baffle plate to the other and around the inner peripheral wall of the wind box. There is also a plurality of uniformly distributed openings 59 extending through the baffle plate 58 for permitting a limited flow of air therethrough substantially throughout the area of the baffle plates 58. The openings 59 and the annular open space 60 thus combine to afford a substantially uniform distribution of the limited flow of air from one side of the baffle plate to the other. The lower baffle plate 61 has a similar space 63 extending around its inner periphery and adjacent the wall of the cupola body 21. The openings 62 in the baffle plate 61 are somewhat smaller than the openings 59 of the baffle plate 58 and therefore there is a greater closed surface thereon. The baffle plate 61 thereby offers an increasing resistance to the flow of air blast moving down through the wind box from one level to a lower level and thereby further rectifies any inequalities which may continue to exist in the air blast moving through the wind box. In the modification shown in Figure 8 it is necessary that the relative amount of restriction desired be obtained by experiment or by calculation so that the proper amount of resistance and limitation of flow may be afforded. As there is no adjustable means for changing the size of the openings in the baffle plate there is of course no indicating means to indicate the degree of restriction.

For purpose of demonstrating the function of the several parts, the diagrammatical view of Figure 9 is shown. The view of Figure 9 is obtained by opening up the wind box along a longitudinal seam and looking at it as one would look at the wind box from the center of the cupola. The position of the six tuyères is illustrated in Figure 9 and the relative position of the inlet opening 25 in respect thereto is shown in this view. The spacing and the size of the parts in Figure 9 are not necessarily proportioned as the showing is merely diagrammatical for purposes of aiding in the clarity of the description. For purposes of describing the construction and function of the several parts the portion of the wind box above the complementary baffle plates 40 and 38 will be referred to as the sub-chamber 64, the portion of the wind box intermediate of the complementary baffle plates 40 and 38 and the complementary baffle plates 42 and 44 will be referred to as the sub-chamber 65, and the portion of the wind box below the complementary baffle plates 42 and 44 will be referred to as the sub-chamber 66. As the air blast enters the wind box 22 from the inlet opening 25 it circles around the arcuate wind box at a rapid rate of speed. A great many inequalities in the velocity of portions of the air blast in its movement through the wind box are set up by reason of the nature of the air blast and the confining walls of the wind box. It has been found, for example, that the velocity of the air blast next adjacent to the outer arcuate walls of the wind box is much greater than the velocity of the air blast next adjacent to the body of the cupola at the inner peripherial edge of the wind box. In the absence of the baffle plates in the wind box, the air blast moving from the inlet 25 to the entrances of the plurality of tuyères will move in a number of directions and in currents of unequal velocity of a nature too complicated to define. A rapid tangential flow past the tuyère entrances disturbs the flow of air into each tuyère to cause inequalities therein and requiring rectification. The deflecting action of the interior arcuate wall of the wind box and the meeting of one current by another prevent any simple direct flow of the air blast from the inlet to the several tuyères. Among the several factors which produce a complex flow of currents, cross currents, and counter currents are the collision of the air blast traveling around the wind box at a rapid rate with the air blast later entering the wind box from the inlet, centrifugal force, tangential flow, deflection by the walls of the wind box, collision of currents, the difference in routes taken by the air blast toward the several tuyères, and other known and unknown factors enter into the influences effecting the flow of the air from the common source to the entrances of the plurality of tuyères. In wind boxes without rectification of the air blast moving through the wind box and before it reaches the entrances of the tuyères, there is a great inequality in the velocity of the air blast entering each of the several tuyères. Without such proper rectification the velocity of the air entering one tuyère will be in excess of what would be proper and the velocity of the air blast entering another tuyère will be below what would be proper. As has been explained, the inequalities of the velocities of air entering the several tuyères seriously impairs the melting operation and the use of the furnace.

Referring to Figure 9 it is seen that the air blast first enters the sub-chamber 64 which is divided off from the rest of the wind box by the complementary baffles 38 and 40. The registering openings 39 and 41 being evenly distributed permit a limited flow of air therethrough throughout the area of the complementary baffle plates. The proper degree of restriction afforded by the complementary baffle plate is of course obtainable by adjustably changing the degree of registration of the openings 39 and 41. In the portions of the wind box where the air blast tends to be excessive in velocity the resistance of the baffle plate tends to dam up the flow of air blast and the excess flows through an opening of the baffle plate at areas in which the velocity is not excessive. The damming or restricting action of the baffle plates thus modifies the flow of the air blast to tend to equalize the flow of the air blast throughout the cross-sectional area of the wind box at the baffle plates. Therefore the air blast instead of rapidly circling the wind box in strong current is modified when it meets the restriction of the baffle plate and seeps or is pressed downwardly through the openings of the baffle plates. To provide a further rectifying influence upon the air blast if found necessary there may be provided a secondary dam or restriction provided by the complementary baffle plates 42 and 44. Since the air blast is traveling at a very rapid rate of speed it may not be entirely rectified to be completely equally distributed in velocity by the first set of baffle plates. By subjecting the air blast to the additional restricting action any further rectification necessary may be afforded. Also in order not to stifle or restrict the flow too suddenly it may be desirable to have a smaller amount of restriction in the first baffle plate met by the air and a greater amount of restriction in the next succeeding baffle plate met by the air blast. After being partially rectified by the first baffle plate met by the air a greater rectification by increased resistance and limitation of flow may be had without serious impairment of the total velocity of the air blast.

It is therefore seen that the air blast first enters the sub-chamber 64 from whence it is supplied to the sub-chamber 65 and from whence it is supplied to the sub-chamber 66. By this downward distribution of the air blast through the rectifying baffles from one sub-chamber to another an evenly distributed supply of air moving at substantially equal velocity is delivered to each of the plurality of tuyères.

The nature of the air blast is changed by the rectifying influence of my apparatus. The air blast is converted from one of unequal densities and velocities moving tangentially and in other unrelated and conflicting directions to an air blast of a uniform density throughout the cross section area of the wind box moving at the same velocity downwardly in the wind box toward the entrances of the tuyères. There may be recorded a slight pressure drop found in the air blast as it successively moves downwardly from one sub-chamber to another due to the rectification of excessive velocities of portions of the air blast.

The downward flow can continue only until the bottom of the wind box is reached and then there will be a tendency to build up pressure in the lower part of the wind box, and, because the air supply is substantially evenly distributed and the flow is vertical in a straight line, the pressure will be built up evenly around the entire wind box. It necessarily follows that the tuyères, being placed equal distances from the bottom of the wind box, will all be in a zone of substantially equal pressure; also that all tuyères, being of equal size, will pass substantially equal volumes of air in a given time at substantially equal velocities.

By the rectifying apparatus I have provided there is a resistance to relatively excessive velocities of the air and a uniform distribution of the air blast to supply the air at substantially equal velocities to each of the plurality of tuyères without disturbance of volume and thus a proper control of the melting zone.

Altho I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a furnace having a wind box forming a common distributing chamber for supplying blown air to the entrances of a plurality of tuyères communicating with said furnace, said wind box having an inlet adapted to communicate with a source of said blown air, a baffle plate mounted within the wind box intermediate of, and at a distance from, said inlet and said entrances for restricting the flow of air through the wind box from the inlet to said entrances, said baffle plate having a plurality of open spaces substantially evenly distributed therein for permitting limited flow of air therethrough from one portion of the wind box to another portion of the wind box, the body of the baffle plate checking said flow to modify the relative velocity of the flow of air through each of said open spaces to said another portion of the wind box, the said air being delivered to the plurality of tuyères from said another portion of the wind box at velocities modified by said baffle plate.

2. In a furnace having a wind box forming a common distributing chamber for supplying blown air to the entrances of a plurality of tuyères communicating with said furnace, said wind box having an inlet adapted to communicate with a source of blown air, a plate positioned in said wind box to partition said wind box into a sub-chamber adjacent said inlet and a sub-chamber adjacent said entrances, said plate having a plurality of open spaces extending therethrough to permit a restricted flow of air therethrough, said open spaces being distributed to substantially equalize the velocity of air flowing through said open spaces from one sub-chamber to the other sub-chamber, the said air being delivered to the entrances of the tuyères at said equalized velocities.

3. In a wind box for furnishing a blast of blown air from a common source to a plurality of tuyères in which the tuyères are substantially uniform in size and distribution to afford uniform volume delivery of blown air through the tuyères, a plate positioned in the wind box to provide a restricting barrier to the flow of air in the wind box toward said tuyères, said plate having resisting surfaces and open spaces distributed over the extent of the plate to permit a limited flow of air through said open spaces, the distribution of said resisting surfaces and open spaces providing a resistance to the flow of air at greater velocities at some areas of the plate relative to the flow of air at lesser velocities at other areas of the plate, the air flowing through said open spaces prior to distribution to said tuyères being modified in velocity by said resistance and said limited flow.

4. In a furnace having a wind box for supplying a blast of air to a plurality of tuyères, said wind box having an inlet adapted to communicate with a source of an air blast and having outlets in communication with said tuyères, a restricting member positioned within the wind box for restricting the flow of the air blast passing through the wind box from the inlet to said outlets, said restricting member being positioned at a distance from said outlets to avoid constriction of said air blast entering said outlets, said restricting member having resisting surfaces and open spaces arranged for limiting the flow of air through portions of said wind box, the said limited flow of air being distributed substantially equally throughout the cross-section area of the wind box at said restricting member to supply air to said outlets at substantially equal velocities.

5. In a furnace having a wind box for supplying a blast of air to a plurality of tuyères, said wind box having an inlet adapted to communicate with a source of an air blast and having outlets in communication with said tuyères, a plurality of partitions dividing said wind box into adjacent sections, said partitions having open spaces substantially uniformly distributed therein, said partitions restricting the flow of air through the wind box and permitting limited flow of air through said open spaces from one section to the next succeeding section of the wind box, the successive flow of air from one section to another through said open spaces modifying the flow of air through the wind box to supply air at substantially equal velocities to said outlets.

6. In a furnace having a wind box for supplying a blast of air to a plurality of tuyères, said wind box having an inlet adapted to communicate with a source of an air blast and having outlets in communication with said tuyères, a plurality of partitions dividing the wind box into successive sections, said partitions having a plurality of open spaces uniformly distributed therein, respectively, for substantially equalizing the resistance to air flow throughout the extent of said partitions, valve means for changing the area of the open spaces in each of said partitions, and adjustable means operable from the exterior of the wind box for adjustably operating said valve means, the said partitions providing resistance to flow of air through the wind box and the open spaces permitting limited flow of air therethrough, the distribution of the limited flow through the uniformly distributed open spaces from one section to another substantially equalizing the velocity of the air flow supplied to said outlets.

7. In a furnace having a wind box positioned around the body of the furnace for supplying a blast of air to a plurality of tuyères entering the furnace, said wind box having an inlet adapted to communicate with a source of an air blast and having outlets in communication with said tuyères, resisting means positioned in said wind box intermediate of, and at a distance from, said inlet and said outlets for resisting the portions of the air blast flowing at velocities greater than the velocities of other portions of the air blast, and distributing means extending through said resisting means at spaced intervals through the cross-sectional area of the wind box for distributing the flow of the blast of air at substantially equal velocities around the cross-sectional area of the wind box at said outlets to supply air at said substantially equal velocities to said tuyères.

8. In a furnace having a wind box positioned around the body of the furnace for supplying air to a plurality of tuyères entering the furnace, said wind box having an inlet adapted to communicate with a source of an air blast and having outlets in communication with said tuyères, a partition positioned in said wind box intermediate the inlet and the outlets for resisting the initial flow of air through the wind box toward the outlets, a plurality of conduits extending through said partition for permitting a limited flow of air through each of said conduits, said conduits being substantially uniformly distributed around the body of the furnace for distributing said flow of air through the conduits around the body of the furnace, the arrangement of the partition in the wind box and the said conduits being such that the blast of air is supplied at substantially equal velocities to the wind box at the said outlets.

9. In a furnace having a wind box positioned around the body of the furnace for supplying air to a plurality of tuyères entering the furnace, said wind box having an inlet adapted to communicate with a source of an air blast and having outlets in communication with said tuyères, the arrangement of the wind box, inlet, and outlets being such that currents of air of unequal velocities circulate through the wind box, baffle plate means carried by the wall of the wind box and extending into the wind box in the path of the flow of air, said baffle plate means resisting the said flow of air to obstruct said currents of air, and conduit means extending through said baffle plate means to permit limited flow of air therethrough, said conduit means being arranged to uniformly distribute the flow of air to the portion of the wind box adjacent said outlets, the uniform distribution of the flow of air to said portion of the wind box providing a supply of air flowing at substantially equal velocities to each of said outlets.

10. The method of controlling the velocities of air supplied to a plurality of tuyères of a furnace, comprising: passing an air blast through a conduit, supplying the air blast through the conduit into an enlarged air chamber, restricting the flow of air from one portion of the air chamber to another, permitting a limited flow of air from said one portion of the air chamber to said another portion of the air chamber, distributing the limited flow of air uniformly throughout said another portion of the air chamber, and supplying the air blast from said another portion of the wind box to said tuyères at substantially equal velocities.

11. In the operation of a furnace, the method of furnishing an air blast to a plurality of tuyères having predetermined volume capacities, comprising: supplying an air blast to a wind box, partially enclosing the air blast in one portion of the wind box, permitting a limited flow of the air blast into a second portion of the wind box, and distributing the said limited flow uniformly throughout said second portion of the wind box, and supplying said air blast to each of said tuyères in said predetermined volumes at substantially equal velocities.

12. In a furnace having a wind box for supplying a blast of air to a plurality of tuyères, said wind box having an inlet adapted to communicate with a source of an air blast and having outlets in communication with said tuyères, a partition dividing the wind box into successive sections, said partition having a plurality of open spaces uniformly distributed therein for substantially equalizing the resistance to air flow throughout the extent of said partition, valve means for changing the area of the open spaces in said partition, and adjustable means operable from the exterior of the wind box for adjustably operating said valve means, the said partition providing resistance to flow of air through the wind box and the open spaces permitting limited flow of air therethrough, the distribution of the limited flow through the uniformly distributed open spaces from one section to another substantially equalizing the velocity of the air flow supplied to said outlets.

13. In a furnace having a wind box for supplying a blast of air to a plurality of tuyères, said wind box having an inlet adapted to communicate with a source of an air blast and having outlets in communication with said tuyères, a partition dividing the wind box into successive sections, said partition having a plurality of open spaces therein adapted to permit air to flow therethrough, a plate adapted to slidably engage said partition, said plate also having a plurality of open spaces therein adapted to permit air to flow therethrough, the open spaces in said plate being adapted to register with the open spaces in said partition, and adjustable means operable from the exterior of said wind box for adjustably sliding said plate laterally of said partition to change the registration of said open spaces, the said partition and plate providing resistance to flow of air through the wind box and the registrable open spaces permitting adjustable limited flow of air therethrough, the adjustable restriction to the flow of air from one section to another modifying the velocity of the air flow supplied to said outlets.

14. In a furnace having a wind box positioned around the body of the furnace for supplying air to a plurality of tuyères entering the furnace, said wind box having an inlet adapted to communicate with a source of an air blast and having outlets in communication with said tuyères, a partition positioned in said wind box intermediate the inlet and the outlets for resisting the flow of air through the wind box toward the outlets, a plurality of conduits extending through said partition for permitting a limited flow of air through the partition, the conduits in said partition being distributed at intervals around the body of the furnace for distributing said flow of air around the body of the furnace, the arrangement of the partition in the wind box and the said conduits being such that the blast of air is supplied to said outlets at velocities modified by the distribution of the limited flow through said conduits.

15. In a furnace having a wind box positioned around the body of the furnace for supplying air to a plurality of tuyères entering the furnace, said wind box having an inlet adapted to communicate with a source of an air blast and having outlets in communication with said tuyères, a plurality of successive partitions positioned in said wind box intermediate the inlet and the outlets for resisting the flow of air through the wind box toward the outlets, a plurality of conduits extending through said partitions, respectively, for permitting a limited flow of air through each of said partitions, the conduits in each of said partitions being distributed at intervals around the body of the furnace for distributing said flow of air around the body of the furnace, the arrangement of the partitions in said wind box and the said conduits being such that the blast of air is supplied to said outlets at velocities modified by the distribution of the limited flow through said conduits in the respective partitions.

HERBERT A. REECE.